United States Patent [19]
Schistad

[11] Patent Number: 6,104,830
[45] Date of Patent: Aug. 15, 2000

[54] METHOD AND APPARATUS FOR CORRECTION OF COLOR CAST IN A DIGITAL IMAGE

[75] Inventor: Bernhard Schistad, Hammel, Denmark

[73] Assignee: Purup-Eskofot A/S, Ballerup, Denmark

[21] Appl. No.: 08/981,528

[22] PCT Filed: Jun. 24, 1996

[86] PCT No.: PCT/DK96/00278

§ 371 Date: Apr. 6, 1998

§ 102(e) Date: Apr. 6, 1998

[87] PCT Pub. No.: WO97/01150

PCT Pub. Date: Jan. 9, 1997

[30] Foreign Application Priority Data

Jun. 22, 1995 [DK] Denmark .................................. 714/95

[51] Int. Cl.⁷ .............................. G06K 9/00; G06K 9/36; G06F 15/332; G03F 3/08
[52] U.S. Cl. .......................... 382/167; 382/162; 382/281; 358/518
[58] Field of Search ..................................... 282/162, 167, 282/276, 281; 358/518, 520, 522

[56] References Cited

U.S. PATENT DOCUMENTS

| 4,685,071 | 8/1987 | Lee ........................................... | 382/162 |
| 5,220,615 | 6/1993 | Ishii et al. ............................... | 382/281 |
| 5,357,352 | 10/1994 | Eschbach ................................ | 358/518 |
| 5,371,615 | 12/1994 | Eschbach ................................ | 358/515 |
| 5,420,704 | 5/1995 | Winkelman .............................. | 358/520 |
| 5,495,428 | 2/1996 | Schwartz ................................. | 364/526 |

OTHER PUBLICATIONS

R. >Gonzalez and R.E. Woods, "Digital image processing", Addison–Wesley Publishing Company, Inc., pp. 432–438, 1992.

D.B. Judd, et al., "Color in Business, Science and Industry", 3rd Ed., pp. 40–69 and pp. 234–245.

Bartleson, et al., "Exposure Determination Methods for Color Printing: the Concept of Optimum Correction Level", Journal of SMPTE, vol. 65, pp. 205–215, 1986.

Lee, "A Physical Color Balance Model for Digital Image Processing", SPSC, 42nd Annual Conference, pp. 205–215, 1986.

*Primary Examiner*—Leo H. Boudreau
*Assistant Examiner*—Dmitry A. Novik
*Attorney, Agent, or Firm*—Merchant and Gould P.C.

[57] ABSTRACT

The invention relates to a method and an apparatus for the analysis and correction of colour casts in a digitally represented image. According to a preferred embodiment, the crominance contents of the image may be transformed by use of a Hough-transformation or the like transformation, wherein the line structures in the carthesic system of co-ordinates for the crominance content is transformed to a representation in a Hough-diagram in the form of a polar system of co-ordinates, since such line structure is hereby transformed into a point structure. The Hough-diagram is examined with a view to finding a cell in the diagram which has the highest value and the cell found is saved. subsequently cells are neutralized in the Hough-diagram within a predetermined angular distance, and the Hough-diagram is re-examined with a view to finding that diagram cell which, following neutralization, has the highest value. The cell found is saved and the cells saved which represent the maximae in the Hough-diagram are used to determine the intersecting points for lines in the crominance content system, and said intersecting points are used to evaluate the discolouration of the image.

17 Claims, 8 Drawing Sheets a)

b)

METHOD AND APPARATUS FOR CORRECTION OF COLOR CAST IN A DIGITAL IMAGE

The invention relates to a method of correcting colour casts in digitally represented images and comprising the features disclosed in the introductory part of claim 1, and an apparatus having the features disclosed in the introductory part of claim 16.

The term colour cast is used to designate the colour deviations of a photograph from what is expected. That is, it is experienced that the colours represented in a given photograph deviates from what is considered correct. The phenomenon of colour casts relates exclusively to photographs since they are considered representations of impressions from the surroundings, and during the evaluation of the representation they are compared to our experience of how the world looks.

Colour casts occur either as a result of a mistake on the photographer's part or a mistake in the photographic production of the photograph, or it may be due to the fact that the photograph does not reflect the prevailing visual conditions. In the photographic production of the photograph, colour casts may occur if the development does not correspond to the film used, or if the film or the chemical development process is faulty. Mistakes may also occur in connection with a scanning of the image. The scanning equipment may be operated in a wrong manner or the scanner may be calibrated wrongly. Lastly, the transformation between the colour models of the different apparatuses may be faulty. Images with colour casts are experienced as wrong or poor even if the the photograph is a technically correct representation of the surroundings which has merely been recorded in unusual visual conditions.

Colour casts are the result of a subjective phenomenon which originates in our expectations to a subject, but the expectation has a certain general character thereby allowing guidelines to be established for the correction to be carried out of the photograph in order to make it meet the non-formulated expectations. This is among others discussed in "Color in Business, Science and Industry", by D. B. Judd et al., 3rd edition, John Wiley & Sons Inc., New York, ISBN 0-471-45212-2.

The colour fidelity of a photograph describes the colour authenticity with which a photograph reproduces the original subject. In order to obtain such authenticity, a variety of conditions must be allowed for in the photographic process.

Over the years, this discovery has resulted in a technique which allows a lithographer to correct a photograph. The technique presupposes the presence in the photoghraph of areas which may be considered neutral. They may be completely light or completely dark areas. The correction of the colour planes is divided into three independent areas, the most light areas being designated highlights, the most dark areas being designated shade and the grey shades therebetween being designated intermediate shades. Much experience and insight are required for carrying out adequate correction of a photograph. Even to an experienced lithographer the process will be lengthy. A variety of software packages for the correction of colour casts is already available. Examples include Adobe Photoshop® and Corel PhotoPaint® which are colour processing programmes whose function is to adjust colour planes in highlights, shades and intermediate shades, respectively. It requires that the lithographer in charge is capable of evaluating which pixels are neutral and which planes are to be corrected in order to obtain the desired neutrality.

The only programme which comprises a function for the correction of colour casts is the image processing programme LinoColor® available from the Linotype-Hell AG company. LinoColor® corrects colour casts by determining a shade and a highlight point in the image, and the operator may subsequently choose to perform corrections in the shade, in the highlight or in both places. The effect of the discolouration correction may be controlled in several steps thereby allowing for a strong, a standard, a weak, or no correction at all.

The grey-balance problem is discussed among others by R. W. Huboi et al. in the article "Exposure Determination Methods for Color Printing: The Concept of Optimum Correction Level", Journal of SMPTE, vol. 65, pp. 205–215, 1956. Therein statistical methods are used to find a good statistic predictor which may be used in a regression.

In "A Physical Color Balance Model for Digital Image Processing", SPSC, 42nd annual conference, pp 205–215, 1986, Hsien-Che Lee points to a deterministic solution model wherein it is utilized that the reflections from plane, homogeneous surfaces vary with different illuminations. The change in the reflections entails changes in the colour intensity, whereas the chromatic information remains unchanged. In a colour model where the chromatic information is separated from the intensity, e.g $L^*a^*b^*$ or a CIE-chromaticity diagram, the individual elements of the image or pixels originating in the reflection of the surface will be represented as a curve which converges towards the neutral point of the colour model. In case several heterogeneous surfaces are involved, several curves will be formed which converge towards the neutral point.

This knowledge is utilized today by an experienced operator, typically a lithographer, who examines a photograph, selecting some significant areas, estimates the bias for the photograph on the basis of these areas and his experience. The procedure continues iteratively until the operator is pleased with the result.

It is the object of the invention to provide a method of correcting colour casts in naturalistic photographs, the term naturalistic photographs being used to designate digitally represented photographs which are recordings of actual sceneries. The photographs may be produced photographicly and subsequently scanned in to obtain a digital representation, or they may be registered digitally from the outset by means of a CCD camera or the like.

A section of a photograph and a photograph composed of several other naturalistic photographs are also comprised by the term e naturalistic photograph.

This object is achieved by a method of the kind described in the introductory part, wherein the method is distinguished in comprising the features given in the characterizing part of claim 1.

In accordance with the features given in claim 1, examination of a portion of or all the crominance dimensions of the colour spectre for the presence of completely or fully hidden line-of-convergence structures, allows two or more line-of-convergence structures to be determined as parameterized functions, and enables the determination of at least one mutual intersection on the basis of these line-of-convergence structures, which makes it possible to analyse a given digitially represented photograph and to determine whether it is correctable or not.

Exemplary colour spectres with separate crominance and luminance dimensions include $CIE-L^*u^*v^*$, $CIE-L^*a^*b$ and YCC.

The term. line-of-convergence structures is understood as the formation of a line of the points depicted and represented in the crominance spectre of a photograph. Such line formation is usually not readily visible but may be determined by means of prior art methods for the identification or determination of lines in photographs. A usual photograph will thus in the spectre of crominance be represented by a point fog where the mutual correlation is not readily apparent. However, this problem is known in a wide variety of contexts, such as photographic analysis (for the photographic plane itself), electron paths, etc., and the principles underlying the methods known from these applications can be utilized by the present technique with suitable modifications.

If the crominance content for a photograph is substantially constant, the luminance dimension may be omitted, since the crominance content may be analysed as an aggregate summed-up structure.

Thus, the invention is based on the discovery that the colours of a photograph converge towards neutral when the light source colour is neutral due to surface reflections. Conversely, if the colour of the light source is not neutral, the colours in a given photograph will converge towards the colour of the light source. This convergence may occur in any chosen colour representation standard in its plane or spectre of crominance, since the known standards comprise a neutral point or more specifically an neutral axis which follows the axis of luminance. The invention provides the basis for identifying these lines of convergence.

However, the teachings of the invention also take their starting points in the fact that a photograph with a discolouration or the like colouration error originating in the light source and/or surface reflections may be corrected directly by shifting the entire colour representation, so that the intersecting point of the lines of convergence coincides with the neutral point or the axis of the system of co-ordinates.

This surprisingly simple correction may thus provide a natural and reproductive correction without the use of manual or subjective methods and is particularly advantageous compared to methods which do not comprise light or dark reference planes or where said reference planes in themselves have a wrong shade of a colour.

Thus, the invention presents not only a substantial technical advantage over the prior art methods as it may be implemented as an automated process. According to the invention it is thus also possible to correct photographic material with a reproduceable result where known methods do not suffice.

So to speak, the method utilizes the convergence of the reflections which occur as a reaction to the prevailing light conditions, since they jointly form that line for the ideal colour present in the perspective which forms the basis of the analysis or correction of the photograph or the photographic representation.

It is a further characteristic feature of the invention that an evaluation count is obtained for an occurring colouration defect or a discolouration found, from which it may be determined whether the photograph is correctable or not and, in the affirmative, that a correction may be carried out so as to reconstruct the ideal and natural colour composition of the photograph by correcting the data of the photograph to obtain a correct or substantially correct neutral point.

Furthermore, it should be noted that the method utilizes lines of convergence which, in practice, represent the reflection shades which, all things being equal, means that the method is simplified and becomes more reliable as the number of reflection shades present increases.

By combining histograms with polarly represented co-ordinates, a simple and more clear way of finding the dominating line structures which are to be or may be used as a starting point for the determination of intersecting points.

Of course, it is within the scope of the invention to use other methods for the identification of the lines of convergence present in the crominance dimension.

An alternative method within the scope of the invention may e.g. be implemented iteratively as, taking one's starting point in a photographic representation in a crominance spectre, a number of probable line of convergence components may be selected, and subsequently it is checked whether the remaining points corresponding to said line are actually to be considered a part of a line, and in that case to parameterize the same. If the point is false, the procedure should subsequently be repeated in accordance with given guidelines.

In accordance with the features described in claim 2, the division of the colour spectre into colour cells constituted of quantized crominance and luminance axes enables a practical embodiment since such representation will be suitable for the processing of larger amounts of photographic data.

The individual photographic points or pixels will thus be depicted in colour cells.

In accordance with claim 3, determination of at least two coinciding intersections from which non-coinciding intersections are subsequently separated makes it possible to optimize the quality and the reproduceability of the analysis made, since determination of a suitable amount of intersection which suits the purpose makes it possible sort out any false intersections, should they deviate substantially form the remaining intersections found.

A sufficient amount of intersecting points may for certain applications be 3–5.

In accordance with claim 4, by allowing the angle between the line-of-convergence structures in the crominance spectre for the determination of the intersection or—sections to exceed 10°, preferably 25°, it is possible to initially reduce the uncertainty associated with the intersections found, since any uncertainty in the determination of the angles of the lines of convergence structures in the colour spectre provides a reduced uncertainty on the intersecting point found as the angle increases. This applies in particular when the calculations on one or more levels are quantized.

In accordance with claim 5, by weighting the pixels present in the crominance dimension, the further option of identifying the line of convergences present becomes available, or that of simplifying the necessary calculations since the colours which occur infrequently will not be weighted equally with the colours that occur frequently.

One method of weighting these pixels could be a logarithmic histogram in the colour spectre.

In accordance with claim 6, by allowing the examination of the crominance dimension of the colour spectre to comprise an approximation of part of or all of the carthesic crominance representation of all the pixels to a parameterised function via a Hough-transformation, a practical embodiment according to the invention is obtained, as the pixels in the colour spectre may be approximated to any parameterised function. In some types of colour spectres, the line-of-convergence structures will thus be arcuate curves, which is why in this case the Hough-transformations may be used for the approximation of arcuate line-of-convergence structures.

In accordance with claim 7, by allowing the Hough-transformation approximate part of or all the carthesic crominance representation of the pixels (x,y) to a polar representation ($\theta,\rho$), since the polar representation is quantised in $\theta,\rho$ whereby the line representation is depicted in an accumulator cell constituted of the respective θ,ρ-quantised co-ordinates, an advantageous embodiment according to the invention is obtained.

Since the accumulator cell which obtains the highest value corresponds to the line on which most pixels are situated, it will be suitable on the basis of these accumulator cells to carry out the further calculations in connection with the determination of intersections on the basis of the accumulator cells having the highest value.

In accordance with claim 8, by approximating the pixels in the colour spectre to a straight line in a polar system of co-ordinates via a Hough-transformation using the fomula $$x \cos θ + y \sin θ = ρ$$

wherein x and y represent the carthesic representation in one plane of a colour spectre, θ represents the angle to the axis of abscissa and ρ is the angular distance from origo to the line, a practical embodiment according to the invention is provided since several of the most used colour spectres for the representation of digital photographs will contain straight line-of-convergence structures.

In accordance with claim 9, by approximating the colour spectre to a straight line in a polar system of co-ordinates via a modified Hough-transformation following the formula $$x \cos θ + y \sin θ = ρH_{log}(a^*,b^*)$$

wherein x and y represent the carthesic representation in a plane of a colour spectre, θ represents the angle to the axis of abscissa, and ρ is the angular distance from origo to the line, and wherein $$ρH_{\log}(a^*, b^*) = ρ_{\log}\left(\sum_{x,y} U(a^*, b^*)\right)$$

U(a*,b*) being a unit function which is summed-up over the entire x,y plane, a particularly advantageous embodiment according to the invention is obtained, since the scaling of a point on a line in the x,y plane is contained in the approximation. In practise this allows for the calculation of very well defined line-of-convergence structures.

The use of a logarithm function in this context is associated with the exemplary advantage that it is avoided that two or three colours dominate and that other line-of-convergence structures drown.

In accordance with claim 10, by letting the intersections of the line-of-convergence structures (x,y) be found by the formula $$x=(ρ-y \sin θ)/\cos θ, \text{ and}$$

$$y=(ρ1 \cos θ2 - ρ2 \cos θ1)/\sin(θ1-θ2), \text{ wherein}$$

ρ1,θ1 represent the co-ordinates of the one line in the polar representation in the form of a point or an accumulator cell in the polar Hough diagram, ρ2,θ2 represent the co-ordinates of the second line, and ρ,θ are any of the two lines co-ordinates, a simple calculation of intersections between two lines is obtained which may by used in a corresponding manner for all the line-of-convergence structures found.

In accordance with claim 11, selecting iteratively on or more line candidates in the crominance dimension and subsequently carrying out a summation of the square on the distance of pixels to the line candidate, the line candidate being selected from among pixels where the summation assumes a minimum, a further advantageous embodiment according to the invention is obtained since an iterative calculation of found line candidates may in some instances be advantageous and simple.

The method employed is also called the least square method.

In accordance with claim 12, subsequent correction of the data of the digitally represented photograph depending on said intersectional relation whereby the intersecting point of the line structure is displaced to or near to the neutral point of the colour spectre or the colour plane provides effective and reproductive correction of colour style or other colouration defects in the photograph. The method may be adapted to various applications on the basis of knowledge of the colour reproduction properties of currently used printers or reproduction equipment whereby the use of the reproduction equipment becomes less critical.

Of course, the correction should be adapted to the chosen colour standard.

In accordance with claim 13, linear correction of crominance data of the digitally represented photograph depending on said intersecting relation, whereby the intersecting point of the line structures is shifted to or near to the neutral point of the colour spectre or the colour plane, provides a surprising and simple correction of a photograph with colour casts or other colouration defects, since the total colour spectre may so to speak an a whole be shifted in such a manner that the neutral point(s) found in the analysis coincide(s) with the theoretical neutral point for the chosen colour standard.

In accordance with claim 14, subdivision of the colour spectre into a number of luminance layers, and separate analysis of one or more luminance layers make it possible to perform a more detailed examination of a photograph and its colour conditions, since each luminance layer thus well defines a crominance dimension which may be examined separately.

A sufficient number of luminance layers may e.g. be five for a number of applications.

In accordance with claim 15, separate correction of each luminance layer, if correction is possible, provides an effective possibility of obtaining good and reliable photographic correction.

It will also be possible to sort out corrections found in specific luminance layers.

In accordance with claim 16, implementation of the method in a computer for the processing of digital photographic data provides optimum utilization of the invention since analysis and correction may be carried out automatically and most advantageously without any manual surveillance.

If other measures are taken to ensure that the crominance contents of the photographic element group is substantially constant, it will suffice in the determination of the colour distance to concentrate exclusively on the relative positioning of the points along the luminance axis.

Since the photograph is a matrix structure, the pixel element group may advantageously be constituted of photographic elements within a rectangular frame. If several highlight or shade areas are available, discolouration estimates may be made for each of these areas, and the spreading of or variance in these discolouration estimates may be used to assess the quality or the unambiguity of the relevant discolouration. The invention will now be described with reference to preferred embodiments and with reference to the drawings, wherein FIG. 1 schematically illustrates the L*a*b*-colour spectre wherein the plane expanded by a* and b* contains the chromatic information;

Figure 5:
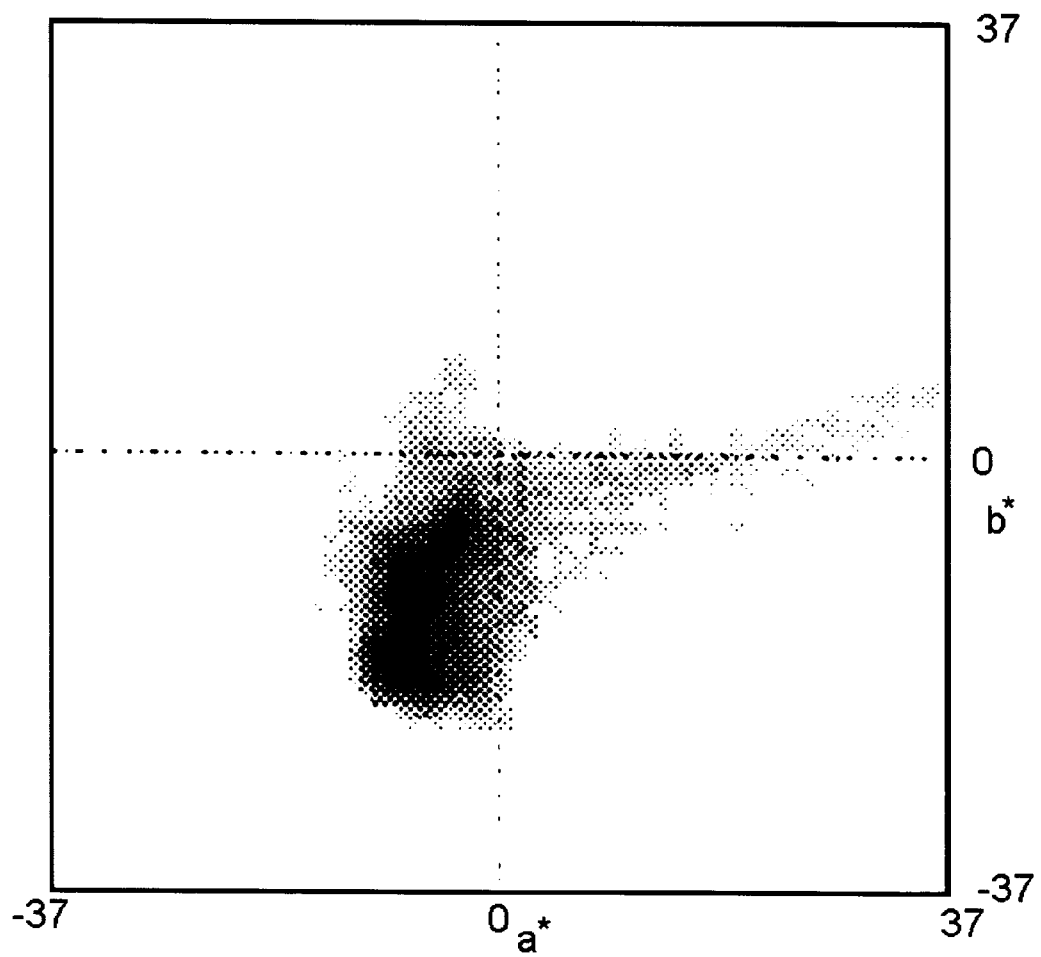
FIG. 5 illustrates the same photograph as FIG. 4, the frequency of the colours within a cell being recorded whereby the colours most frequently occuring will appear the darkest.
Figure 8:
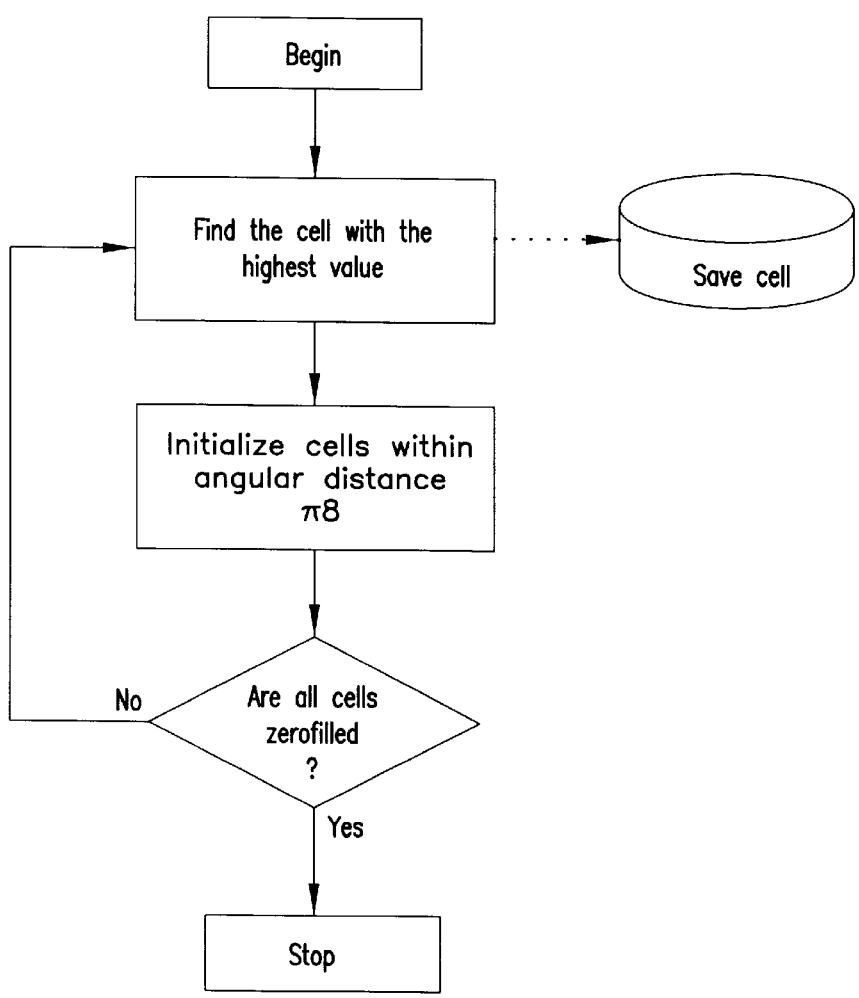
FIG. 8 illustrates a route diagram for determining the line structure in a diagram corresponding to FIG. 5.
Figure 9:
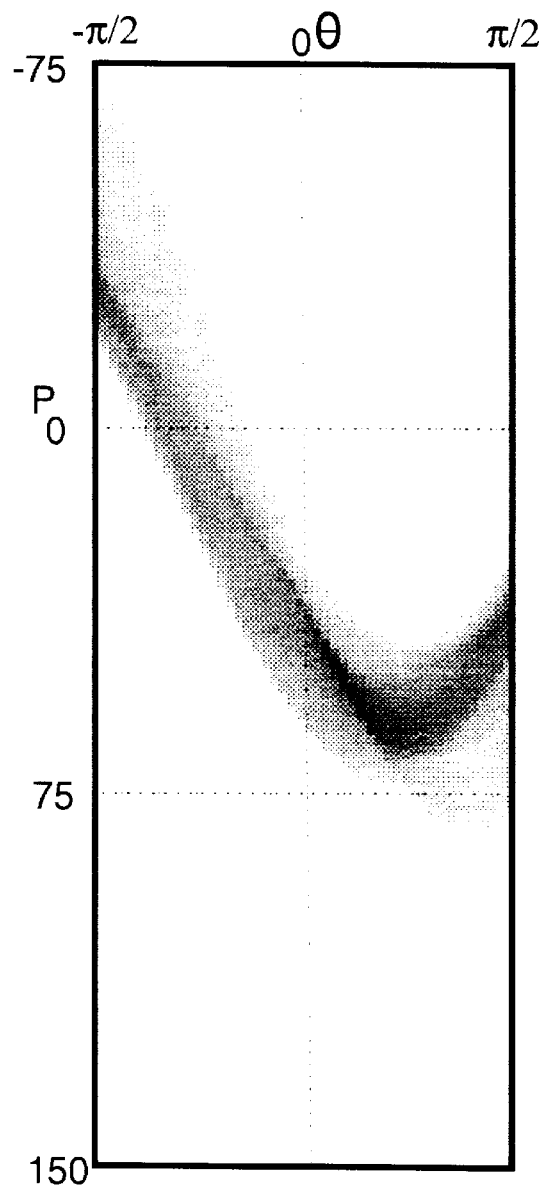
Figure 10:
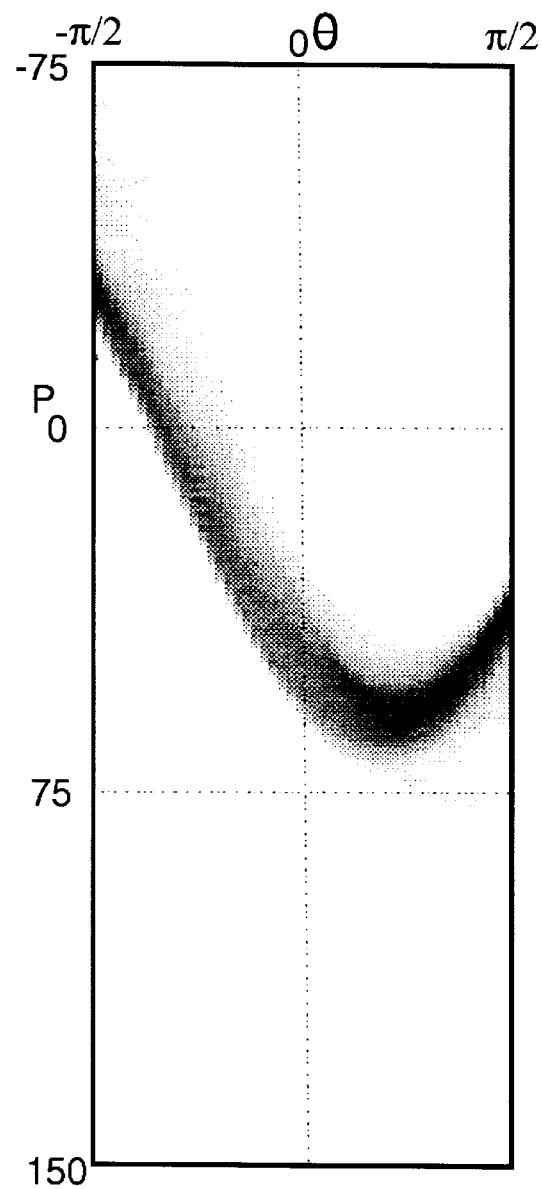
Figure 11:
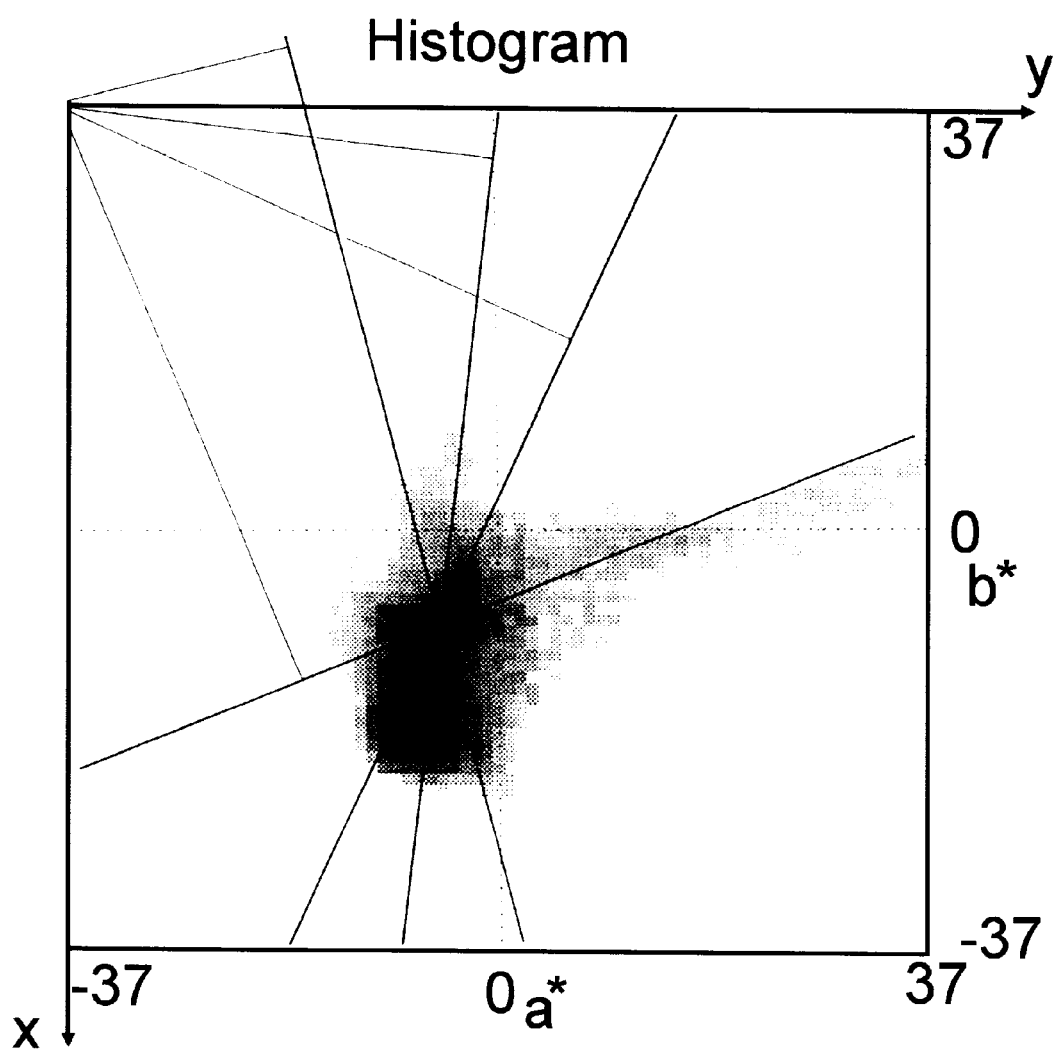

FIGS. 9,10 show results of the Hough-transformation in a test photograph, FIG. 9 showing the result from a conventional Hough-transformation while FIG. 10 shows the result of a modified Hough-transformation; and FIG. 11 shows the insertion of lines determined in the method illustrated in FIG. 8 where the lines were inserted into the diagram illustrated in FIG. 5, and wherein the intersecting point of the lines is used as an estimate of the discolouration of the photograph.

Figure 1:
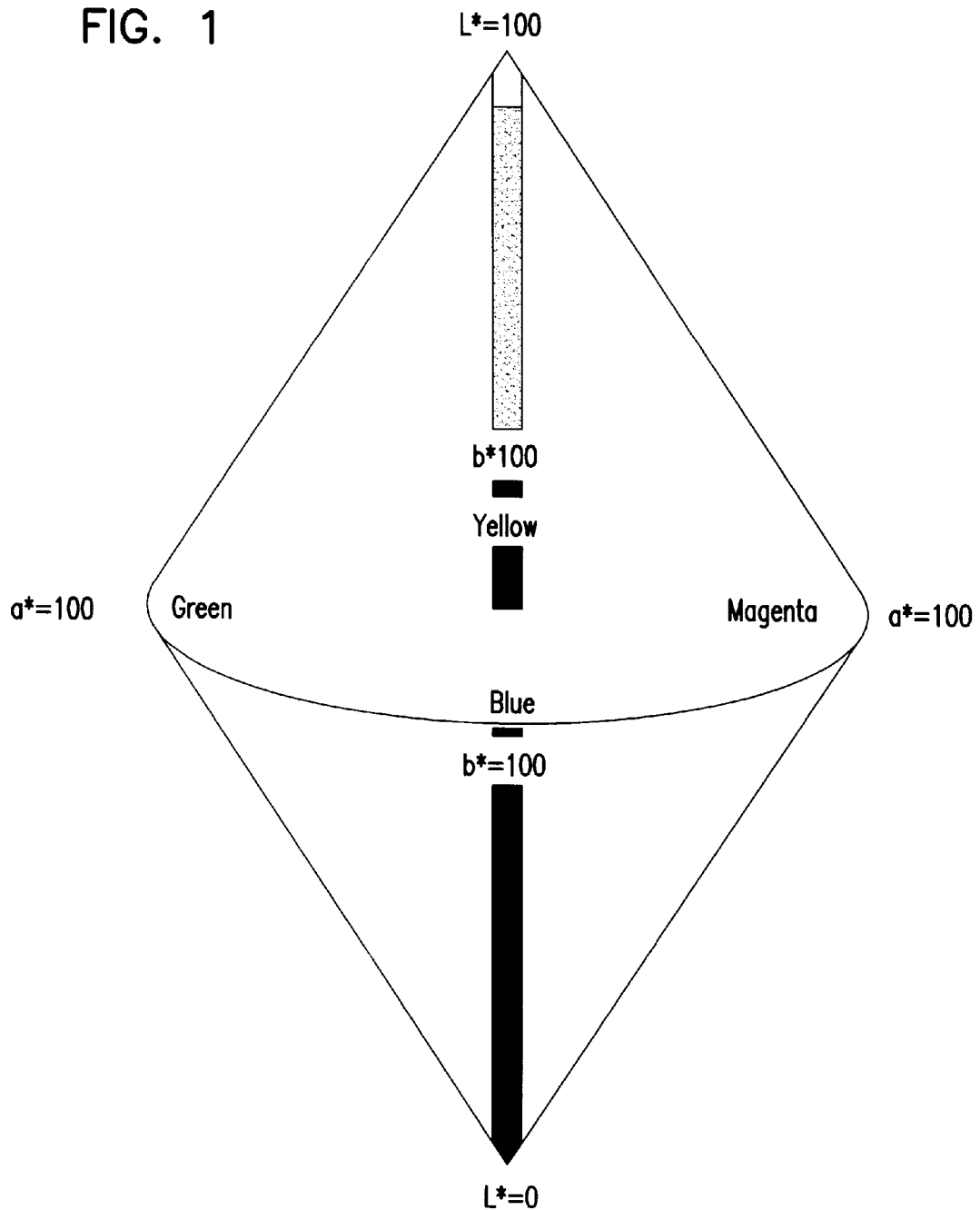

In a first method the discolouration of a photograph is determined in accordance with the L*a*b* representation, the luminance and crominance contents of the photographic elements being separated as shown in FIG. 1. Other colour models where this is also the case may also be used, e.g. the CMYK model which is recommended by CIE. In his abovementioned article, Judd et al. accounts for the representation of the visible colours in the L*a*b model. The parameters a* and b* are the chrominance coordinates of the L*a*,b*-model. The model is as shown in FIG. 1.

Figure 2:
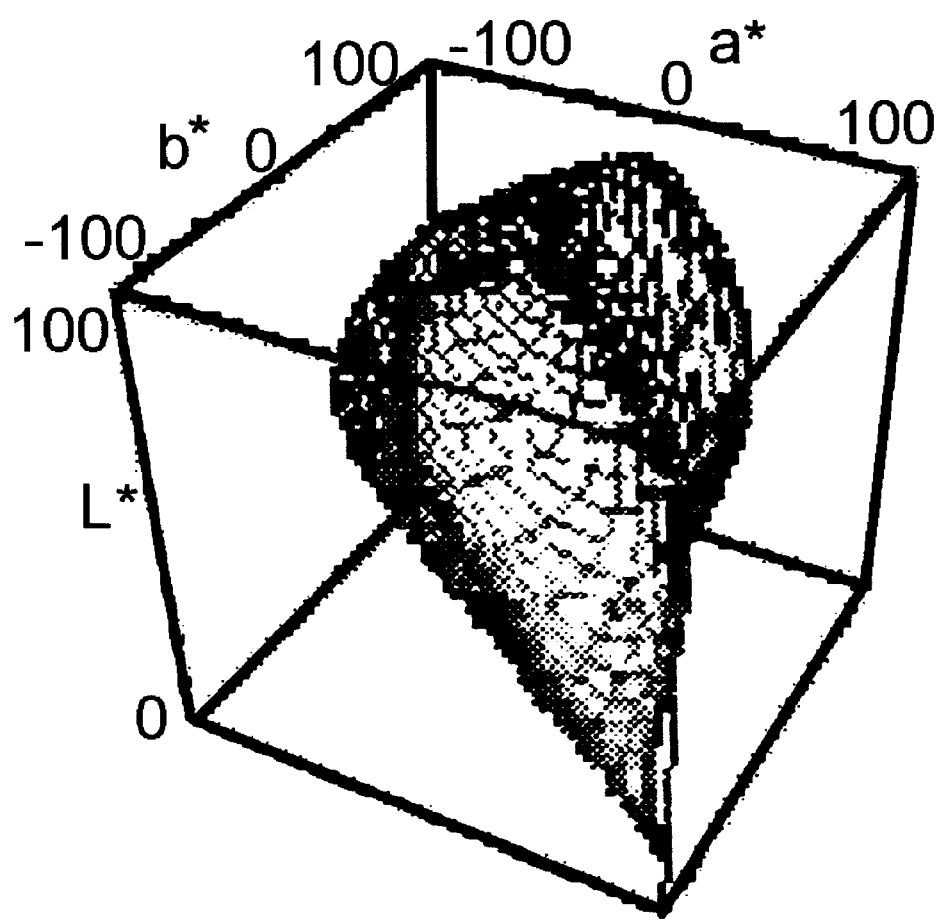
FIG. 2 shows a surface plot for a test photograph in the L*a*b* colour spectre to illustrate the positions of the visible colours.

An example of a colour photograph's representation in the L*a*b*-model is shown in FIG. 2. Here the information is contained in a cube which provides improved illustration of the colour distribution of a photograph compared to the normal L*a*b*-model where the crominance parameters are situated on a surface in a plane, and wherein the crominance parameters are depicted along an axis perpendicular to this plane. Shade and highlight will be situated at the extreme points of the L*-axis.

Figure 3:
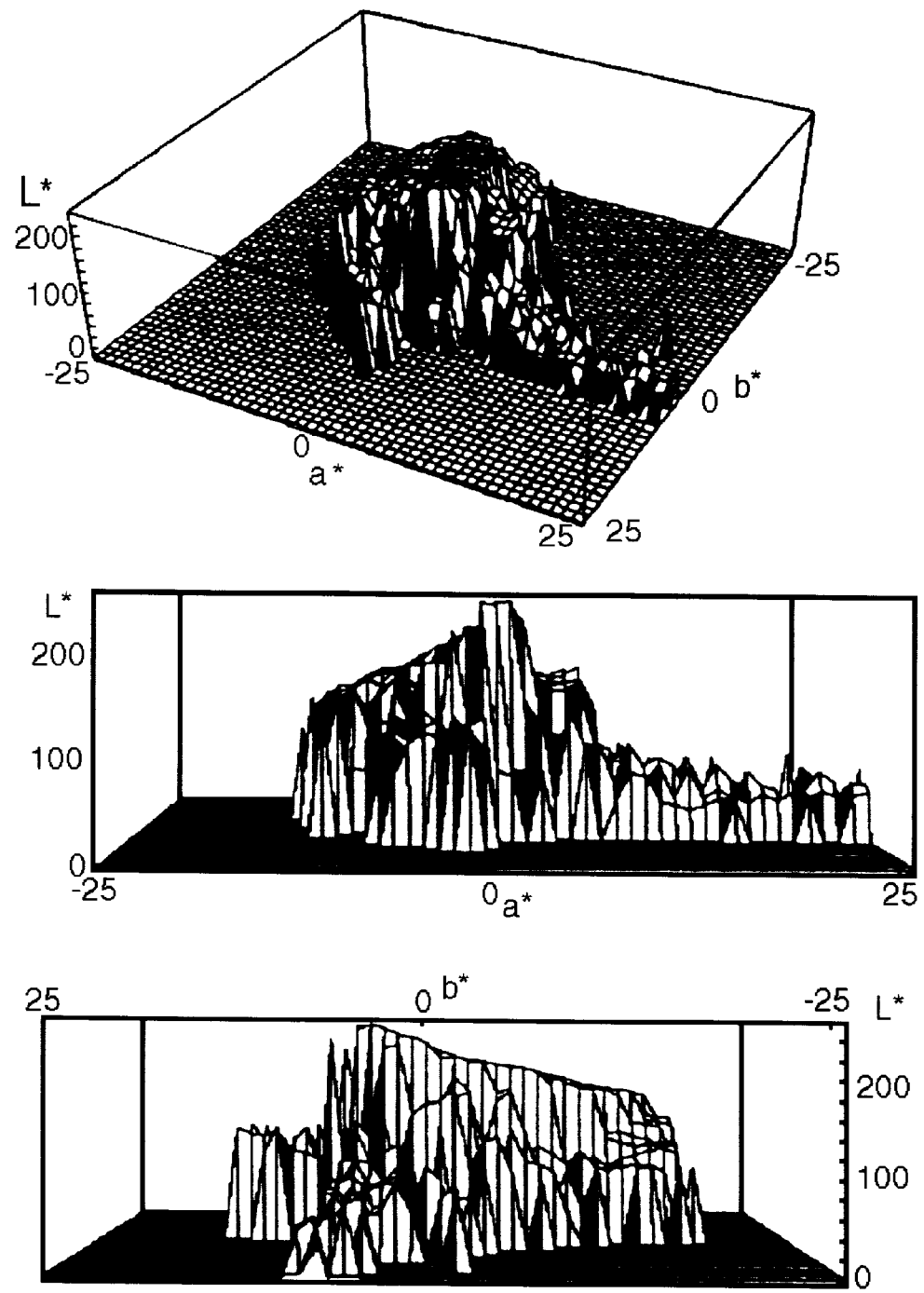
FIG. 3 illustrates three plots of the surface of the structure produced for a picture in the L*a*b colour spectre.

FIG. 3 is a representation from which it will appear that there is a discolouration in the b*-orientation.

The noise occurs in limited form and it may be reduced by a low pace or a median filtration. However, in this context it may have some adverse effects since a general filtration will produce an interpolation and thus destroy minor shadow/highlight points and require a separate run-through of the photograph which will reduce the time available for the correction.

The method according to the invention is based on the discovery that colours converge towards neutral.

For many photographs the diagram is star-shaped. What could be observed was that when the photograph was corrected for colour casts it would most often look like the centre of the star, corresponding to neutral in the colour spectre.

Figure 4:
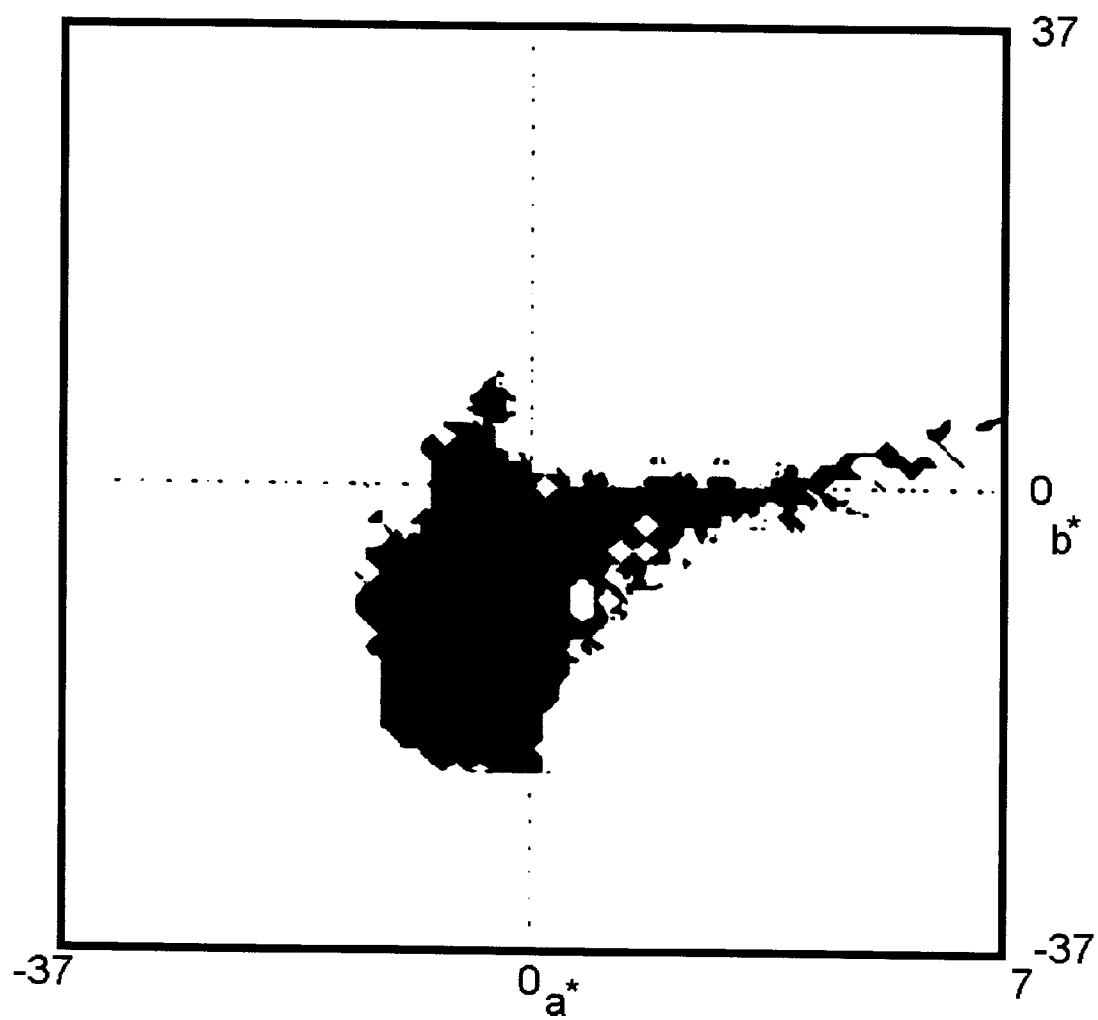
FIG. 4 shows an a*b*-diagram from a test photograph for illustration of the colour distribution of the photograph.

The plot in FIG. 4 is a corresponding plot in the L*a*b*-colour spectre for a test photograph. With some ingenuity, there may be observed a tendency to the centre of the three-armed star being situated at appr. (a*,b*)=(−4,−7). It is inconvenient but possible to determine the centre of a binary chromaticity diagram since the colours which rarely occur in the photograph are scaled equally with the colours which occur frequently. In a histogram the number of times the colour occurs in the photograph is summed up and this number may be transferred onto a chromaticity diagram like $$H(a^*, b^*) = \sum_{x,y} U(a^*, b^*) \qquad \text{Formula 1}$$

$U(a^*,b^*)$ is a unit function which always has the result 1, and x,y indicates that summations are carried out throughout the whole photograph. The result of such histogram is that two to three dominating colours are visible in the plot. To avoid this, it is chosen to use a logarithmic histogram defined as follows $$H_{\log}(a^*, b^*) = \log\left(\sum_{x,y} U(a^*, b^*)\right) \qquad \text{Formula 2}$$

The result will appear from FIG. 5. The use of a histogram makes it possible to observe how colours converge towards a centre. By following the darkest areas in the histogram, two lines which intersect in a point corresponding to (a*, b*)=(−4,−7) may clearly be perceived.

In order to reach the point towards which convergence is directed, it is necessary to approximate "the arms" in the plot by means of a parameterized function. The plot in FIG. 5 indicates that a successful approximation is a straight line.

By using a parameterised function, the option of carrying out analytical or iterative calculations on the line structures thus becomes available.

One method of approximating structures to a parameterised function is by using a Hough-transformation. A Hough-transformation may be used to approximate structures to any function. To approximate lines, the algorithm maps colinear points from a carthesic system of co-ordinates (x,y) to a point in a polar system of co-ordinates (θ,ρ). The relation between the systems of co-ordinates may be written as $$x \cos \theta + y \sin \theta = \rho \qquad \text{Formula 3}$$

wherein ρ represents the angular distance from origo to the line and θ is the angle to the axis of abscissa, cf.

Figure 6:
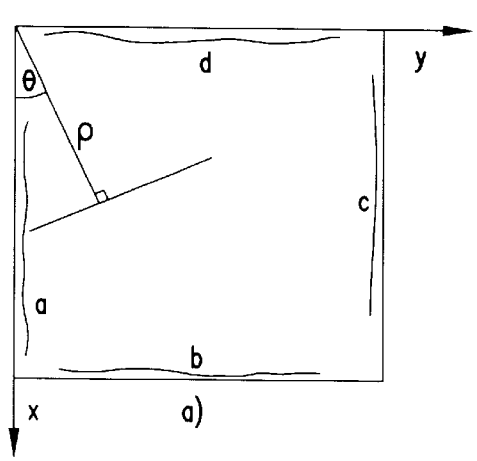
FIGS. 6,7 illustrate the effect of a Hough transformation, the lines strucures shown in FIG. 6, however, being transformed into point structures in FIG. 7.

FIG. 6. If in a photograph there are n colinear points in the (x,y) system of co-ordinates, the solving of formula 3 will yield n curves in the (θ,ρ) system of co-ordinates. All curves will intersect in one and only one point corresponding to the θ,ρ parameters for the line.

Figure 7:
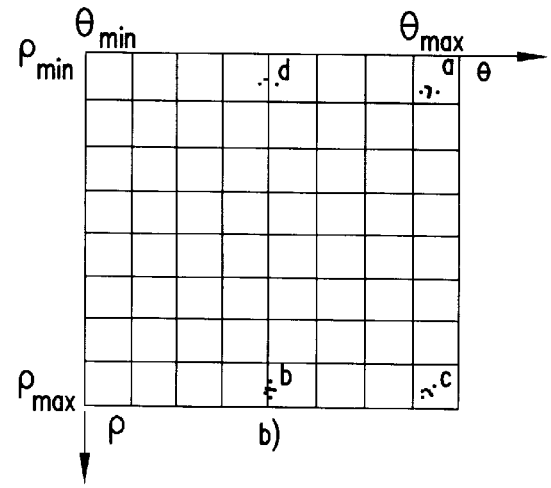

The magnitude of calculation is enormous since formula 3 needs to be solved for all points within the (x,y) system of co-ordinates following which the intersection for all solutions is to be found. In order to reduce the calculation magnitude the (θ,ρ) system of co-ordinates is quantised. This is done by dividing the θ and ρ axes into intervals whereby a number of so-called accumulator cells is formed in the (θ,ρ) system of co-ordinates, cf. FIG. 7. For each θ interval the corresponding ρ value is calculated which is rounded off to the most proximate ρ interval and the relevant accumulator cell is counted. The accumulator cell which reaches the highest value corresponds to the line which contains most points. The accuracy of the parameterisation is determined by the size of the accumulator cells.

The traditional Hough-transformation is based on points which corresponds to binary depictions. As illustrated in FIG. 4, a part of the information is lost due to the use of a binary histogram which means that the Hough-transformation in the histogram is transferred to the parameterisation.

One way of modifying the Hough-transformation to effect transfer of the information contained in the histogram is to accumulate the scaling of a point to a line. This will modify formula 3 into $$x \cos \theta + y \sin \theta = \rho H_{log}(a^*, b^*) \qquad \text{Formula 4}$$

wherein $H_{log}(a^*,b^*)$ is defined like in Formula 2.

Tests have been performed with both types of Hough-transformations and the results will appear from FIGS. 9 and 10. In the test $\theta_{min}=-\pi/2$ and $\theta_{max}=\pi/2$. This interval is quantised in 50 steps which yields a maximum quantising error of $\pi/100 \approx 2°$. The interval $\rho$ depends on the size of the histogram. If the histogram has the size n×n, $\rho_{min}=-n$ and $\rho_{max}=2n$, which is quantised in 3n steps, which yields a maximum quantising error of 0.5.

The Hough-diagram is to be used for finding intersections between lines which requires reasonable disparallelism between the lines. This means that the selection of line sections from the Hough-diagram should be effected stepwise to ensure that the quantising error does not dominate the result. A calculation of the exact quantising error has not been effected since this result would be a function of $\rho_1$, $\rho_2$, $\theta_1$, $\theta_2$, k, cf. formula 5. But with a disparallelism of $\pi/8$ and $\rho_1=\rho_2=n$, the quantifying error in (y,x)-coordinates will be about 1 which is reasonable for this application.

In order to ensure that this requirement is met, the method outlined in FIG. 8 is used to find candidates for converging lines.

The intersection between two lines, $\theta_1$, $\rho_1$ and $\theta_2$, $\rho_2$ may in (x,y) be expressed as $$x = (\rho - y \sin \theta)/\cos \theta, \text{ and}$$

$$y = (\rho_1 \cos \theta_2 - \rho_2 \cos \theta_1)/\sin(\theta_1, \theta_2) \qquad \text{Formula 5}$$

For the calculation of x, both $\theta_1$, $\rho_1$ and $\theta_2$, $\rho_2$ may be used.

In order to compare the conventional Hough-transformation to the modified version, the intersections between the first four lines are intended for both types of transformations. The results for the conventional Hough transformation are very ambiguous. This is due to the fact that the Hough-transformation actually expresses the maximum length in the binary plot in FIG. 4. Conversely, the modified Hough-transformation is very unambiguous. All intersections are in the proximity of (x,y)=(32,46), or in the proximity of L*a*b*-coordinates (a*,b*)=(−5,−9). If this is compared to the point of convergence which was observed in the histogramme, FIG. 4, it is surprising how unambiguously the intersections have been determined. In FIG. 11 the fine lines have been inserted into the logarithmic histogram for the photograph.

When line parameterisation of a histogram for a photograph is carried out, the point of convergence for the entire photograph is found. As already shown, the discolouration is not a global imbalance, but an imbalance as a function of L*. It is possible to use the modified Hough-transformation in various sections of the photograph so that the point of convergence is found as a function of L* in the sense that the colour spectre is divided into a number of luminance spectres, e.g. five, following which they are examined separately in the crominance dimension.

The modified Hough-method has been used on quite a number of photographs.

With the method which utilizes the fact that all colours converge towards neutral, it is possible to find the grey balance in all points of the L*-axis provided a sufficient amount of different colours is found in the relevant area. In that case the method is extremely suitable. It is a further advantage of the method that it is possible to calculate the uncertainty in the intersection of the lines of convergence found.

Finally it should be repeated that alternative and suitable methods may be used for selecting or determining the line-of-convergence structures in addition to the methods described herein.

What is claimed is:

1. A method of analyzing and optionally correcting color casts or coloring errors in a digitally represented image, wherein each photograph is represented by a number of pixels or photographic points in a color space with separate chrominance and luminance dimensions, wherein
   a) part of or all of the chrominance dimensions of the color space are examined to establish completely or partially hidden line of convergence structures,
   b) that two or more line-of-convergence structures are determined as parameterized functions, and that
   c. on the basis of these line-of-convergence structures at least one mutual intersecting point is established for determining a color convergence of the digitally represented image; and
   wherein the examination of a Cartesian chrominance dimension of the color space comprises an approximation of a portion of or all of the image points to a parameterized function via a Hough-transformation; and
   wherein the image points in the color space are approximated to a straight line in a polar system of co-ordinates via a modified Hough-transformation according to the formula $$x \cos \theta + y \sin \theta = \rho H_{log}(a^*, b^*))$$

wherein x and y designate the Cartesian representation in a plane of a color space, $\theta$ designates the angle to the axis of abscissa, $\rho$ is the angular distance from origin to the line, and wherein $$\rho H_{log}(a^*, b^*) = \rho \log\left(\sum_{x,y} U(a^*, b^*)\right)$$

the $U(a^*,b^*)$ being a unit function which is summed up throughout the entire x,y-plane, wherein parameters a* and b* are the chrominance coordinates of the color space.

2. A method according to claim 1, wherein the color space is divided into color cells which consist of the quantized axes of chrominance and luminance.

3. A method according to claim 1, wherein at least two coincidental intersections are determined which are subsequently used for sorting out non-coincidental intersections.

4. A method according to claim 1, wherein the angle between the line-of-convergence structures for determining the intersection or the intersections in a chrominance space exceeds 10°.

5. A method according to claim 1, wherein a weighting of the image points present in the chrominance dimension.

6. A method according to claim 1, wherein the examination of a Cartesian chrominance dimension of the color space comprises an approximation of a portion of or all of the image points to a parameterized function via a Hough-transformation.

7. A method according to claim 6, wherein the Hough-transformation approximates a portion of or all of a Cartesian chrominance representation (x,y) of all the photographic points to a polar representation (θ,ρ) as the polar representation is quantized in θ,ρ in such a manner that a line representation is depicted in an accumulator cell which consists of the respective θ,ρ-quantized co-ordinates.

8. A method according to claim 6, wherein the image points in the color space are approximated to a straight line in a polar system of co-ordinates via a Hough-transformation according to the formula $$x \cos \theta + y \sin \theta = \rho$$

wherein x and y represents the Cartesian representation in a plane of a color specter, θ represents the angle to the axis of abscissa and ρ is the angular distance from origin to the line.

9. A method according to claim 6, wherein the intersections (x,y) of the line-of-convergence structures are found as expressed by:

$$x = (\rho - y \sin \theta)/\cos \theta, \text{ and}$$

$$y = (\rho_1 \cos \theta_2 - \rho_2 \cos \theta_1)/\sin(\theta_1 - \theta_2), \text{ wherein}$$

$\rho_1, \theta_1$ represent the coordinates of the one line in the polar representation in the form of a point or an accumulator cell in the polar Hough-diagram, $\rho_2, \theta_2$ represent the co-ordinates of the second line, and $\rho, \theta$ is any one of the coordinates of the two lines.

10. A method according to claim 1, wherein one or more line candidates are selected in a chrominance dimension whereupon a summation of the square of the distance of pixels to a line candidate is carried out, the line candidate being selected from among the pixels where the summation assumes a minimum.

11. A method according to claim 1, wherein the data of the digitally represented image are subsequently corrected depending on intersection ratios in such a manner that the intersecting points of the line structures are shifted to or near to a neutral point of a color specter or a color plane.

12. A method according to claim 1, wherein the data of the digitally represented image are subsequently corrected linearly depending on intersecting ratios in such a manner that the intersecting point of the line structures is displaced to or near to the neutral point of the color specter or the color plane.

13. A method according claim 1, wherein the color space is subdivided into a number of luminance layers, and that one or more luminance layers are analyzed separately.

14. A method according to claim 13, wherein each luminance layer is corrected separately if correction is possible.

15. An apparatus for the correction of color casts in a digitally represented image according to a method comprising:
a method of analyzing and optionally correcting color casts or coloring errors in a digitally represented photographic image represented by a number of pixels or photographic points in a color space with separate chrominance and luminance dimensions, wherein
a) part of or all of the chrominance dimensions of the color space are examined to establish completely or partially hidden line of convergence structures,
b) that two or more line-of-convergence structures are determined as parameterized functions, and that
c. on the basis of these line-of-convergence structures at least one mutual intersecting point is established for determining a color convergence of the digitally represented image; and wherein the examination of the Cartesian chrominance dimension of the color space comprises an approximation of a portion of or all of the image points to a parameterized function via a Hough-transformation; and
wherein the image points in the color space are approximated to a straight line in a polar system of co-ordinates via a modified Hough-transformation according to the formula $$x \cos \theta + y \sin \theta = \rho H_{log}(a^*, b^*),$$

wherein x and y designate the Cartesian representation in a plane of a color space, θ designates the angle to the axis of abscissa, ρ is the angular distance from origin to the line and wherein $$\rho H_{log}(a^*, b^*) = \rho \log\left(\sum_{x,y} U(a^*, b^*)\right)$$

the U(a*,b*) being a unit function which is summed up throughout the entire x,y-plane, wherein parameters a* and b* are the chrominance coordinates of the color space and wherein the method is implemented in a computer for the processing of digital image data.

16. An apparatus according to claim 15, wherein the computer comprises means for controlling a color application of a printing unit into a medium.

17. An apparatus according to claim 15, wherein the computer comprises means for controlling a color representation on a computer or television screen.

* * * * *